United States Patent [19]
Kraxberger

[11] 3,807,055
[45] Apr. 30, 1974

[54] METHOD AND APPARATUS FOR MEASURING THE MOISTURE CONTENT OF WOOD

[75] Inventor: Gerald S. Kraxberger, Beaverton, Oreg.

[73] Assignee: U.S. Natural Resources, Inc., Portland, Oreg.

[22] Filed: Apr. 23, 1973

[21] Appl. No.: 353,497

[52] U.S. Cl.................. 34/16.5, 34/46, 73/336.5
[51] Int. Cl............................................. F26b 5/04
[58] Field of Search .......... 34/9.5, 13.4, 13.8, 16.5, 34/46; 73/336.5

[56] References Cited
UNITED STATES PATENTS
1,456,809   5/1923   Lyon.................................. 34/16.5
3,430,357   3/1969   Perry................................. 34/16.5

Primary Examiner—John J. Camby
Attorney, Agent, or Firm—Klarquist, Sparkman, Campbell, Leigh, Hall & Whinston

[57] ABSTRACT

A method apparatus for determining the moisture content of wood by measurement of the impedance of the wood utilizing an alternating current electrode sensor connected to a shielded conductor with the shield being ungrounded and driven in phase with the conductor.

9 Claims, 1 Drawing Figure

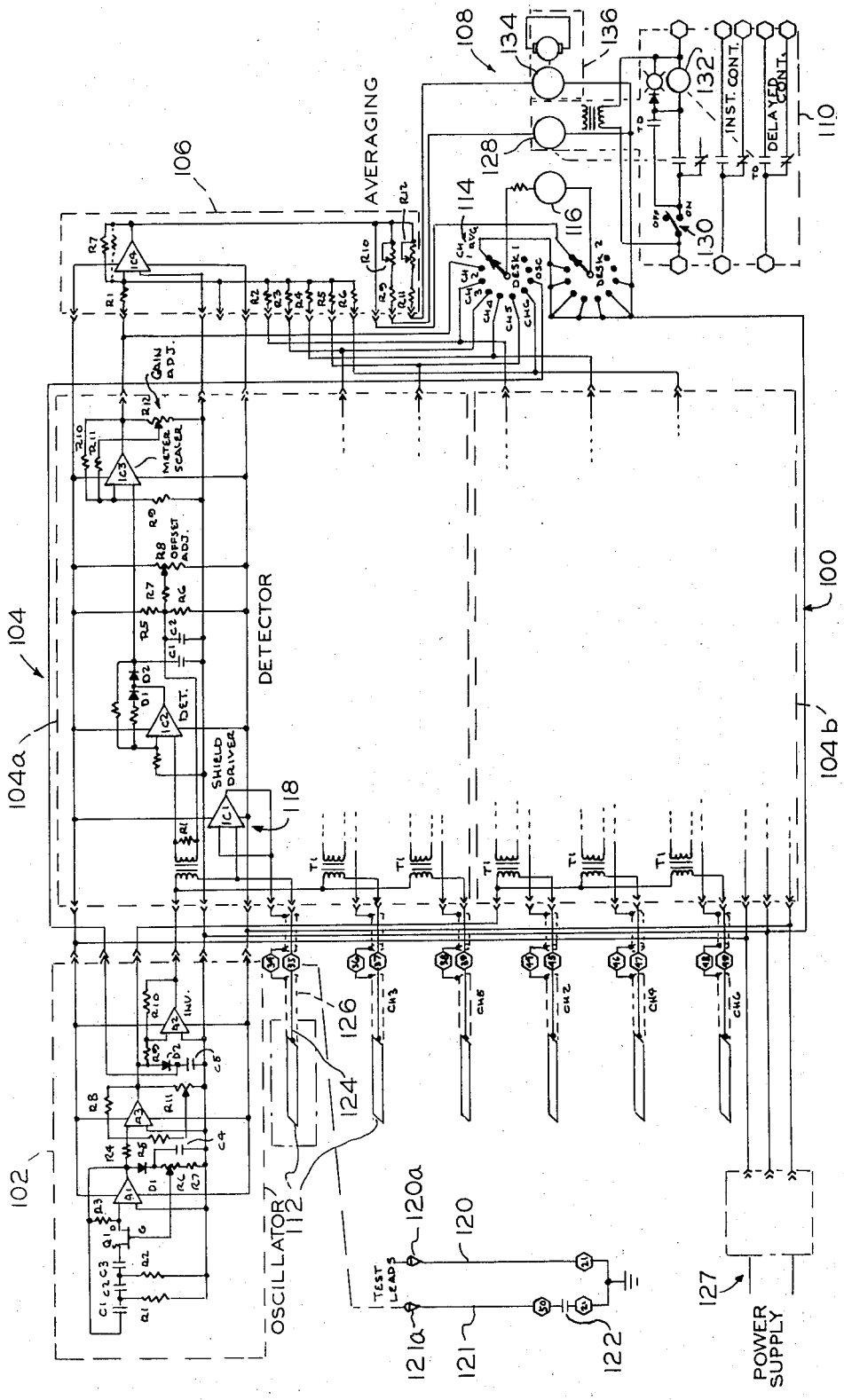

METHOD AND APPARATUS FOR MEASURING THE MOISTURE CONTENT OF WOOD

BACKGROUND OF THE INVENTION

1. Field of the Invention

The present invention relates to the measurement of the moisture content of wood and more particularly to such measurement by measuring the impedance through the wood.

2. Description of the Prior Art

The closest known prior art is U.S. Pat. No. 3,430,357, issued Mar. 4, 1969. Such patent discloses the measuring of the moisture content of the wood using an alternating current impedance measuring circuit having a capacitance bridge circuit including a probe for sensing the impedance to current flow between the probe and ground through a stack of lumber. With the circuit of such prior patent, the impedance measured encompasses a number of extraneous factors other than that due to the moisture content of the wood, almost all of which are resistive and capacitive in nature. Some of these factors are lead wire capacity, probe coupling capacity, moisture content of the lead wire insulation, the manner of lumber stacking, the location of the probe in the load, the thickness of the spacer sticks in the load, the moisture content of the spacer sticks, and so forth. The variations in lengths and thus capacities of the lead wires, particularly for multiple probes, can also seriously affect calibration of the measuring instruments in tending to make calibration difficult and unstable. The probe lead wire length is a particular problem in the measurement of the moisture content of lumber stacks in a dry kiln where most of the moisture-measuring circuitry is outside of the kiln, but the probe leads must extend inside the kiln to the various stacks of lumber, sometimes for a distance in excess of 100 feet. Most of the above factors other than lead wire length and moisture content of the insulation can be eliminated or minimized by following recommended lumber-stacking procedures and other kiln-operating procedures. However, the extraneous effects of lead wire length and insulation moisture can have a significant influence on the measurement of moisture in the load unless effectively neutralized. Thus there is a distinct need for a method and means of neutralizing the effect of lead wire length and insulation moisture in measuring the moisture content of wood using impedance measuring techniques.

SUMMARY OF THE INVENTION

In accordance with the present invention, the effects of lead wire length and insulation moisture on moisture measurements are effectively removed by minimizing the lead wire capacity. This allows easier and more accurate calibration and improved calibration stability of the measuring instruments, and inherent calibration in multiple electrode sensor applications, such as in a lumber dry kiln. The sensor lead wire capacity is minimized by shielding each lead wire and driving the ungrounded shield in phase with the lead wire.

A principal object of the invention is to provide an impedance-type moisture-measuring device having inherent calibration characteristics in that the instrumentation will remain in substantial calibration independently of sensor lead wire length.

An additional object includes the provision of a precision detector circuit portion to minimize ambient temperature effects on calibration and variable offset voltage and calibration due to detector diode forward voltage drop.

Other features include the use of a scaling and impedance isolation amplifier in the detector circuit for better calibration accuracy and an active-type summing amplifier in an averaging circuit portion for improved averaging of the impedance signals from multiple probes.

DESCRIPTION OF THE DRAWING

The single FIGURE of the drawing shows an electrical circuit diagram of a moisture-measuring system in accordance with the present invention.

DETAILED DESCRIPTION

With reference to the drawing, the overall moisture-measuring circuit, indicated generally at 100, is subdivided into subcircuit portions outlined in dashed lines, including an oscillator portion 102 which serves the entire system, a detector portion 104, an averaging portion 106, an indicator portion indicated generally at 108, and an automatic trip circuit portion indicated at 110. The detector portion of the circuitry is in turn subdivided into a first detector board portion 104a and a second detector board portion 104b.

The specific system shown is designed to assist the operator of a lumber dry kiln in determining when a charge of lumber has been dried to the optimum moisture content. The system assists in reducing overdrying, redrying and lumber degrade.

Generally the system includes a main instrument cabinet encompassing all of the components shown in the diagram with the exception of six electrode sensors 112, and corresponding shielded lead wires 124 with shields 126 and leading from the sensors to the cabinet, each of the six sensors and its shielded lead wires and other related circuitry being designated as a separate "channel" and the six channels being shown as CH1–6 in the diagram. The instrument cabinet is mounted on the kiln control room wall, and the six shielded sensor cables or lead wires lead into the kiln to each of six separate lumber cribs. The six electrode sensors each may consist of a thin metal strip, also referred to as a "probe." Each probe is pushed horizontally through the side of the lumber stack within a space provided by stickers inserted between each level of lumber in the stack, there being one probe for each lumber crib. The probes are then connected to the six signal leads 124.

The circuit is supplied with power from power supply 127, which may have a 117 V 60 Hertz or other input, and preferably consists of all solid-state electronics, mostly linear-integrated circuit devices.

The oscillator 102 supplies a signal to each of the six cribs of lumber, and the six detector channels monitor the signal current throughout the drying run.

A channel selector 114 forming a portion of the indicator circuitry 108, and preferably provided on the cabinet face, can be set to present separately the signal from each of the six probes on a meter 116. One of the channel selector positions is labeled AVG and when selected presents the true average of the six probes on the meter 116. Thus the kiln operator can make his decision to shut down the kiln based on the "average" reading and also can compare individual lumber crib drying conditions to detect unbalance of kiln performance due to blower failure, bad heat transfer, or other factors.

The operation of the measuring circuit is based on the theory that the electrical impedance of wood is inversely related to its moisture content. Electrical coupling to the lumber is both resistive and capacitive and is accomplished by the previously mentioned probes. The oscillator supplies an AC voltage across the lumber impedance. This causes an AC current through the measuring device. The current magnitude I is:

$$I = E/Z$$

where I is the AC current, E is the oscillator AC voltage, and Z is the lumber impedance.

In the illustrated circuit, the effect of sensor lead cable capacitance has been reduced to a very small, virtually negligible value by using a low capacitance coaxial cable, the shield 126 of which is ungrounded, and by driving the cable shield in phase with the center conductor 124, or lead wire, voltage. This is done by a shield driver means including the shield driver amplifier IC-1 and the shield driver subcircuit portion, indicated generally at 118, there being a separate shield driver means for each of the separate channels. A current-measuring device or means for each channel includes a small current transformer T1 with a resistor across its secondary. Lumber probe current through the transformer is coupled to the resistor (resistor R1 in the detector subcircuit 104), causing an equivalent AC voltage across it. The precision detector stage including the amplifier IC-2 in detector portion 104 rectifies this voltage which appears as a filtered DC voltage across C-1 of the detector stage 104. An adjustable offset circuit (R-8 and associated components) in the detector stage 104 sets the detector output to zero on the meter 116 to wash out the effect of residual impedance of very dry lumber.

Following the detector stage there is a meter-scaling and isolation amplifier IC-3. This stage has a gain adjustment R-12 which sets the meter 116 and also makes it possible to drive several output devices without upsetting calibration. The subcircuit portions just discussed, including amplifier IC-1, transformer T-1, amplifier IC-2 and amplifier IC-3, all are incorporated in the detector subcircuit 104. There are six such detector subcircuits, each driven by one of the six lumber probes 112 in the illustrated measuring unit.

The probe selector of the rotary switch 114 makes it possible to display any one of the six probe outputs. As previously noted, an averaging position is also available on the rotary switch device. Averaging of the six lumber probe outputs is accomplished by a summing amplifier IC-4 of the averaging subcircuit portion 106. It functions to add up the sensor outputs and divides the sum by the number of outputs to present a continuous average reading on a continuous averaging meter 128.

The oscillator subcircuit 102 is a phase shift type. Resistors R-6 and R-7 of this subcircuit sets the output amplitude and stability. The phase shift network (C-1, C-2, C-3, R-1 and R-2) determines the frequency. The DC voltage across C-4 is indicative of the AC output amplitude.

The oscillator output drives the even-numbered channels and the inverter amplifier A-2 of the oscillator subcircuit. The inverter in turn drives the odd-numbered channels 180° out of phase with the even-numbered channels.

Referring to the left-hand side of the diagram, a pair of test leads 120, 121 is shown, each having an alligator clip 120a, 121a, respectively, with lead 120 being connected to a terminal 21, and lead 121 being connected to a terminal 50 on the circuit panel. Terminal 50 is connected across capacitor 122 to terminal 21, which in turn is grounded. These leads normally hang loosely in the control panel and are used only in calibrating the instrument. With the described circuit, field calibration can be accomplished quickly and easily as follows:

1. All probes or sensors 112 are disconnected from their respective lead wires 124 (normally connected to the probes by alligator clips) and hung so that they do not lay on the floor and so that the end clamps of the leads touch nothing. The opposite ends of all probe leads remain connected to the internal circuitry of the panel at, for example, the terminal 35 with reference to the lead wire of channel CH-1.
2. Jumper 121 from terminal 50 is connected to terminal 35 of channel CH-1.
3. The circuit is energized and allowed to warm up for about 5 minutes.
4. The channel selector switch 114 is turned to its test position designated OSC to confirm that the meter reads to a designated point on the meter scale.
5. The channel selector switch is then set to the channel 1 position, assuming channel 1 is to be calibrated.
6. Meter 116 should now read "zero." If it does not, the zero adjustment potentiometer for channel No. 1, designated R-8 on the detector circuit portion 104, is readjusted until the meter does read "zero." At this point the test lead 121 remains connected.
7. The test lead 120 from the chassis ground terminal 21 is connected to terminal 35 of channel 1.
8. The meter 116 should read "full scale." If it does not, the gain potentiometer for channel No. 1, shown at R-12 on the detector circuit portion 104, is readjusted until it does read "full scale."
9. Test lead 120 is disconnected from terminal 35, and the zero point on the meter rechecked. Steps 5 through 8 above are then repeated to obtain accurate zero and full scale readings. Some interaction will be experienced. When accurate zero and full scale readings are obtained, both test leads are removed from terminal 35 to complete the calibration of channel 1.
10. The above procedure is repeated for each of the remaining channels.
11. As a final check to verify that the lead wire of each probe is not open, a suitable clamp is temporarily attached to the kiln track and the probe lead 124 is clipped to it to verify that the meter reads full scale.

With more specific reference to the lead portions of each channel subcircuit portion designated CH-1, CH-2, etc., the center sensor lead wire is designated 121, and the outer conductive shield portion coaxial cable is indicated at 126. The effect of the shielded lead cable described, particularly when driven by the shield driver means 118 including shield driver amplifier IC-1, is to reduce the effect of the capacitance of the lead wire 124 to an insignificant level, regardless of its length, whereby the length of the lead cable (previously a problem in calibrating the instrument) is no longer a significant factor. To achieve the desired low capacity effect, it is important that the shield 126 remain ungrounded. Wherever possible, a one-inch minimum separation should be maintained between the lead cables and any grounded surface to ensure a maintenance of low capacity in the lead wires 124 of the various channels.

Each signal detector subcircuit portion 104 includes, in addition to the scaling and impedance isolation amplifier IC-2 and associated circuitry and resistors shown, a pair of detector diodes D-1 and D-2, the circuit shown defining a precision detector circuit which is insensitive to ambient temperature changes and therefore particularly suited to dry kiln application.

The indicator portion 108 of the circuit includes, in addition to the rotary selector switch 114 and meter 116 previously discussed, a permanent averaging meter 128 which always gives a reading that is an average of the impedance sensings of the six probes. Meter 128 includes a meter relay that operates at a predetermined high impedance (low average moisture content in the kiln) to close a switch 130 in the automatic trip circuit 110. The closing of switch 130 in turn energizes a time delay relay 132 which, when it times out, either is connected in a manner automatically to shut down the dry kiln or energize an alarm or other signal to tell the operator that the kiln charge has reached a desired low moisture content.

A third meter 134, also a permanent averaging meter, is connected to a chart recorder 136 which provides a permanent records of the average moisture content of the kiln charge during a drying cycle.

SUMMARY OF METHOD

In accordance with the method of the invention, the moisture content of wood is measured by positioning the wood at a moisture-measuring site and then positioning in proximity to the wood an electrode sensor having a shielded conductor lead connected to a source of alternating current, represented in the illustrated embodiment by the oscillator portion of the circuit. A shield driver means, indicated generally at 118, and driven by the shield driver amplifier IC-1, drives the shield 126 and the shielded conductor lead 124 in phase so that the lead 124 has a low capacity. When this occurs and the sensor 112 is in proximity to the wood and the wood is either connected to ground or otherwise electrically connected to the oscillator portion of the circuit, the wood completes the measuring circuit, enabling measurement of the impedance in the circuit across the measuring site in which the wood is positioned. The impedance sensings of the probes 112 are transmitted through leads 124 to the various transformers T-1 to the detector portions of the circuit which act to amplify the impedance signals from the probes and transmit the amplified signals to the averaging portion of the circuit 106. The averaged signal, or a signal from a selected probe, is then transmitted to the indicator portion 108 of the circuit where either the average of the probe signals or a selected signal, or both, can be read.

Having illustrated and described a preferred form of the invention, it should be apparent to those skilled in the art that the same permits of modification in arrangement and detail. I claim as my invention all such modifications as come within the true spirit and scope of the following claims.

I claim:

1. A method of measuring the moisture content of wood comprising:
   providing a moisture-measuring site;
   positioning wood at the measuring site;
   positioning in proximity to the wood an electrode sensor having a shielded conductor connected to a source of alternating current;
   driving the shielded conductor and the conductor shield in phase to form a circuit including the wood;
   and measuring the impedance in the circuit across the measuring site.

2. The method of claim 1 wherein said measuring site is in a wood-drying kiln.

3. The method of claim 1 wherein multiple electrode sensors each having a shielded conductor with the conductor and shield driven in phase are used to sense the moisture content of the wood.

4. The method of claim 3 wherein the shielded conductors are electrically connected to an averaging circuit means to average the impedance measurements of the multiple sensors.

5. A system for measuring the moisture content of wood comprising:
   a source of alternating current;
   an electrode sensor and conductor means connecting said sensor to said source of alternating current;
   said conductor means including a conductor lead extending from said sensor toward said source;
   an electrically conductive shield in surrounding relationship to said lead;
   and shield driver means between said lead and said source for driving said shield in phase with said source.

6. A system according to claim 5 wherein said shield driver means includes a shield driver circuit having a shield driver amplifier means.

7. A system according to claim 5 wherein there are multiple electrode sensors, each having a said conductor lead, conductor shield and shield driving means, the said leads being electrically connected to an averaging circuit means between said leads and said impedance measuring means for averaging the impedance sensed by said electrode sensors.

8. A system according to claim 5 including means defining an automatic trip circuit means electrically connected to an impedance indicating means and operable upon measurement of a predetermined low moisture condition to signal said condition.

9. A system according to claim 8 wherein said automatic trip circuit means includes time delay means operable upon the energizing of said trip circuit means to delay the signalling of said predetermined low moisture condition until after said condition has persisted for a preset period of time.

* * * * *